(No Model.) 2 Sheets—Sheet 1.
J. H. MITCHELL.
MACHINE FOR COATING CAKES, &c., WITH ICING.
No. 525,053. Patented Aug. 28, 1894.
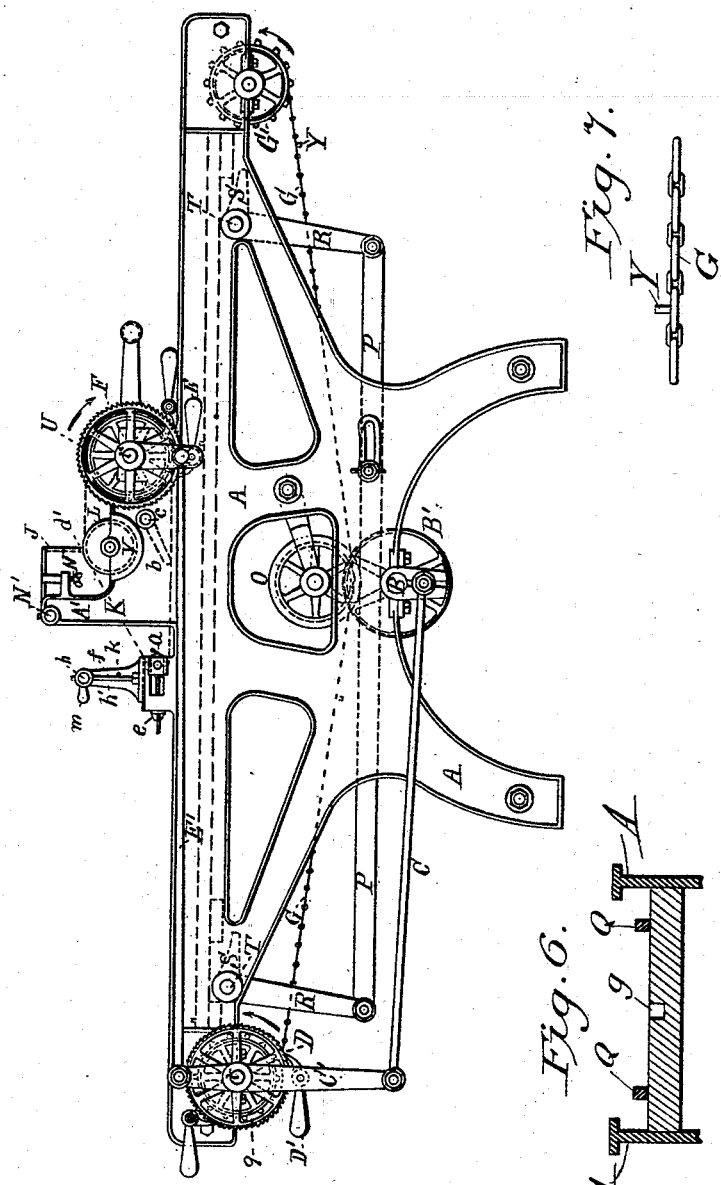
FIG. 1.
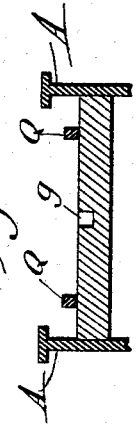
WITNESSES:
Peter A. Kelly
E. Meyer
INVENTOR
J. Henry Mitchell
By Hollingsworth & Maley
ATTORNEYS.

(No Model.)
J. H. MITCHELL.
MACHINE FOR COATING CAKES, &c., WITH ICING.
No. 525,053. Patented Aug. 28, 1894.
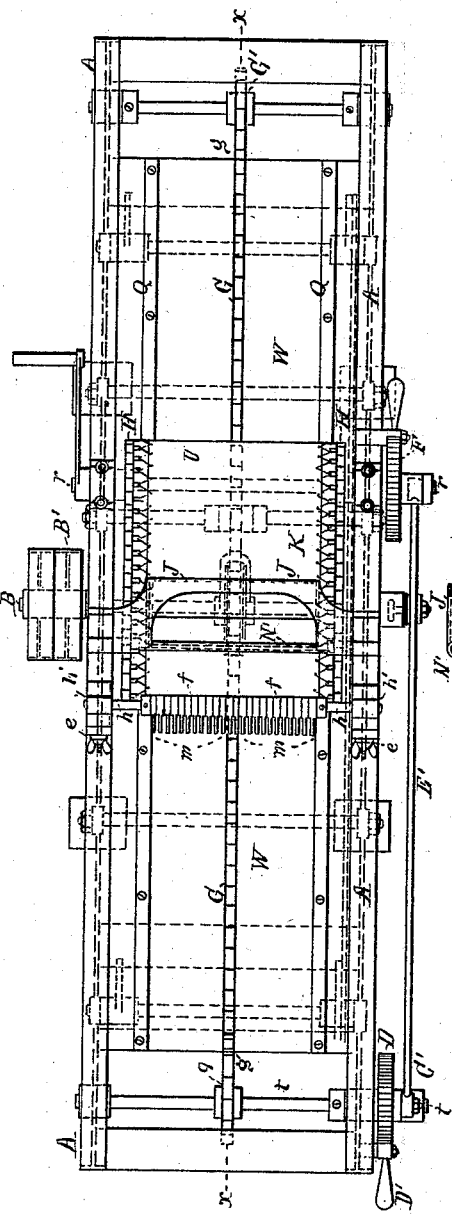
WITNESSES:
Peter A. Kelly
E. Meyer
INVENTOR
J. Henry Mitchell
By Hollingsworth & Haley
ATTORNEYS.

United States Patent Office.

JAMES HENRY MITCHELL, OF PHILADELPHIA, PENNSYLVANIA.

MACHINE FOR COATING CAKES, &c., WITH ICING.

SPECIFICATION forming part of Letters Patent No. 525,053, dated August 28, 1894.

Application filed July 1, 1886. Serial No. 206,888. (No model.)

*To all whom it may concern:*

Be it known that I, JAMES HENRY MITCHELL, of the city of Philadelphia and State of Pennsylvania, have invented certain new and useful Improvements in Machines for Coating Cakes, &c., with Icing or Similar Material, of which the following is a specification, reference being had to the accompanying drawings, wherein—

Figure 1 represents a side elevation of the machine; Fig. 2, a plan view thereof; Fig. 3, a view of some of the working parts, shown in vertical longitudinal section through the center of the machine; Figs. 4 and 5, detail views on an enlarged scale; Fig. 6, a transverse section through the table, and Fig. 7, a detail view of the chain.

The object of the invention is to apply a thin coating of icing, jelly or similar material, to the surface of cakes, &c., uniformly and rapidly; and the principal feature of improvement consists in the use of a belt of porous material, which is kept wet with water applied on one side thereof, while the icing or other material is fed to the other side, and by it transferred to the surface of the cakes. The water penetrating the belt dissolves slightly that portion of the icing which is in immediate contact therewith, thus lessening its adhesion to such an extent, that when the cake comes into contact with the outer surface of the icing, the latter will readily detach itself from the belt and adhere to the cake.

The remaining features of the invention consist in various mechanical devices, hereinafter specified, which I deem the most convenient form for applying the principle upon which my invention depends.

In the drawings, A represents the housings of the machine, and B, the main driving shaft journaled therein, to which power is supplied by means of the pulley B'. The connecting rod C, driven by a crank on said shaft B, leads to a vertical lever C', pivoted upon the shaft $t$, of a ratchet-wheel D. Said lever C', is provided with a pawl D', whereby an intermittent rotary motion is imparted to the ratchet-wheel D. The lever C', is prolonged upwardly and attached to a connecting rod E', which drives, by means of a swinging pawl E, and ratchet-wheel F, a shaft $r$, mounted in bearings upon the top of the housings. The shaft $t$, carries a toothed sprocket-wheel $q$, which actuates an endless sprocket chain G, running over a second wheel G', at the other end of the machine, said chain being stretched by an ordinary belt-tightener O, suspended at a convenient intermediate point.

Between the sprocket-wheels $q$ and G', is a table W, having along each side a raised guide Q, and in the center a longitudinal groove $g$, of sufficient depth to receive the upper run of the chain G, which slides freely therein. Said table is supported upon short rock-arms S, which are rigidly attached to rock-shafts T, extending across the machine near each end, said rock-shafts having also rigidly attached long lever-arms R, connected together at their lower ends by a bar P. Referring to Fig. 3, it will be seen that by moving the bar P, in one direction or the other, the rock-arms S, will be correspondingly turned, and the table will be raised or lowered.

The chain G, is provided, at suitable intervals, with projecting studs Y, which engage with trays or pans I, when the latter are placed upon the table, while the chain itself, being flush with the top of the groove in the table, permits said trays to rest firmly thereon. These trays I, are to receive the cakes to which the icing is to be applied; and it will be seen from the foregoing description that when placed upon the table, at the right hand end of the machine, (as shown in the figures) they will be caused to travel along the table, with an intermittent motion, until discharged at the other end of the machine. It will also be seen that by raising or lowering the lever-arms S, the plane in which said pans travel can be changed.

Having thus described so much of the mechanism as relates to the passage of the cakes through the machine, I will proceed to describe the devices for supplying the icing to their upper surfaces as they pass along the table. A box or hopper J, having an open top and bottom, is suspended so as to swing upon the rod N', which extends across between the upwardly projecting portions A', of the housings. Upon either side of the hopper are vertical set screws N, upon which it is supported, and by the adjustment of which it can be swung slightly in either direction upon the rod N'. Immediately beneath the front side of the hopper (or the right hand side in the drawings) is a roller L, journaled in a trough V, which is suspended between the portions A', of the housings. Upon the shaft $r$, is a drum U, whose upper surface is at the same level with that of the roller, L, and at some distance in the rear of the hopper a small roller, $a$, is mounted in adjustable bearings, $e$. An endless belt K, passes down around the drum U, thence back, parallel to and a short distance above the table W, thence up over the roller $a$, whence it ascends at an incline which conforms with the opening across the bottom of the hopper, and passes over the roller L. The belt K, is made of silk or other absorbent material, and to prevent its being stretched out of shape or slipping, it is provided on each side with endless chains H, to which it is laced, as shown in Fig. 2, said chains engaging with teeth upon the ends of the drum U, (see Fig. 3) so that the whole strain of driving is borne by the chains, which thus carry the belt along with them. The belt K forms the bottom of the hopper J, but is not in close contact therewith, slight transverse openings $d$, $d'$, being left between the surface of the belt and the ends, though not the sides, of the hopper. Beneath the trough V, is a transverse rod $c$, which carries a number of freely suspended fingers $b$, (shown on an enlarged scale in Fig. 5). These fingers $b$, rest upon the belt at an angle thereto, as indicated in Fig. 3. Upon the uprights, $h'$, over the journals of the roller $a$, is a transverse rod $h$, upon which are freely suspended a series of vertical stripping-pins $f$, (shown on an enlarged scale in Fig. 4) each of which has a weighted arm $m$, projecting laterally from the collar by which the pin is suspended. The range of motion of the stripping-pins is limited on the side toward the belt by a cross rod $k$, but on the other side they are free to swing laterally. As will be seen by reference to Fig. 3, the sharp ends of the pins $f$, hang close to, but not in contact with the surface of the belt K, as it turns around the roller $a$.

The operation of the machine is as follows: The hopper J, is partly filled with icing, and the trough V, supplied with water. The belt K being set in motion in the direction of the arrows, the icing flows out through the front opening $d'$ upon the belt, and is carried along by the latter as it travels; the motion of the belt being sufficient to prevent any flow out of the opening $d$ at the back of the hopper. The under side of the belt is wet by means of the roller L, which, being rotated by the belt, brings up the water from the trough V. The belt thus wet, and with the icing upon its outer side, passes down over the roller U. Assuming now that the trays I, having cakes upon them of uniform height, are placed upon the table W, the latter is adjusted vertically until the upper surfaces of the cakes just touch the lower surface of the belt K. The ratchet-wheels D and F, being of the same size and actuated by pawls which have the same swing, cause the belt K, and trays I, to travel at the same rate of speed, although with an intermittent motion. There is thus no tendency on the part of the icing to scrape off from the belt upon the cakes, but they travel along in contact with the icing, and the intermittent motion allows them to "dwell" somewhat. Since that portion of the icing which is in immediate contact with the belt K, has by this time become somewhat dissolved by the water which penetrates the latter, the adhesion of the icing to the surface of the cakes will be much greater than to the belt, and by the time the cakes in their travel have passed out, they will be thoroughly coated with icing. To insure the evenness of the distribution of the icing over cakes which have a slightly rounded or irregular surface, is the function of the fingers $b$. These press down lightly upon the inner surface of the belt as it moves beneath them, and thus mold, as it were, the belt to the contour of the cake. If, by accident, a cake should stick fast to the belt, it will, on making the sharp turn upward around the roller $a$, be thrown out somewhat, so as to be impaled upon one of the stripping-pins $f$, and as the upward motion of the belt continues it will be stripped off therefrom and pushed outwardly, the pin swinging slightly to the left until the impaled cake drops off upon the tray, when the weighted arm $m$, will cause the pin to return to its former position. The belt, with the remaining icing upon its surface, now passes under the back end of the hopper, which, as before stated, is not in close contact with the belt and takes up an even coating of icing before again passing out. By adjusting the screws N, the hopper may be swung in one direction or the other so as to increase or diminish the height of the opening $d'$, at the front, and thus regulate the thickness of the coating. The table W, also can be adjusted at different heights so as to accommodate cakes of any thickness.

Having thus described my invention, I claim—

1. The combination of a reservoir having a suitable opening for outflow of icing, &c., a conveyer composed of absorbent material arranged to move in proximity with said opening, means substantially as set forth for moistening said conveyer, cake-carrying devices arranged in proximity to said conveyer, and actuating mechanism whereby said conveyer and said cake-carrying devices respectively are advanced, substantially as and for the purposes set forth.

2. The combination of a reservoir having an open bottom, an endless belt of absorbent material arranged beneath said reservoir means for operating said belt, a water supplying device arranged in contact with the belt, and cake-carrying-devices, arranged to move in close proximity to the outer surface of said belt during a portion of its travel, substantially as set forth.

3. The combination of a reservoir having a suitable opening for outflow of icing, &c., a conveyer composed of absorbent material arranged to move in proximity with said opening, means substantially as set forth for moistening said conveyer, cake-carrying devices arranged in proximity to said conveyer, actuating mechanism whereby said conveyer and said cake-carrying devices respectively are advanced, and a series of freely suspended fingers resting upon the conveyer at a point beneath which the cakes travel, substantially as and for the purposes set forth.

4. The combination, with the belt, and the actuating mechanism, substantially as described for said belt of the swinging hopper having an open bottom, sides which are in contact with the belt's surface, and front and rear ends in proximity to, but not in contact with the belt's surface, substantially as set forth.

5. The combination, of the conveyer, with the table arranged beneath the same, said table having longitudinal guides along its sides and an intermediate longitudinal groove, and an endless chain moving in said groove and provided with studs projecting above the surface of the table, substantially as set forth.

J. HENRY MITCHELL.

Witnesses:
CHARLES F. ZIEGLER,
HENRY N. PAUL, Jr.